US011342615B2

(12) United States Patent
Davies et al.

(10) Patent No.: US 11,342,615 B2
(45) Date of Patent: May 24, 2022

(54) ELECTROCHEMICAL CELL CAP

(71) Applicant: THE REGENTS OF THE UNIVERSITY OF CALIFORNIA, Oakland, CA (US)

(72) Inventors: Daniel Davies, San Diego, CA (US); Cyrus Sam Rustomji, San Diego, CA (US); Yangyuchen Yang, La Jolla, CA (US); Jungwoo Lee, San Diego, CA (US); Ying Shirley Meng, San Diego, CA (US)

(73) Assignees: The Regents of the University of California, Oakland, CA (US); South 8 Technologies, Inc., San Diego, CA (US)

( * ) Notice: Subject to any disclaimer, the term of this patent is extended or adjusted under 35 U.S.C. 154(b) by 0 days.

(21) Appl. No.: 16/666,155

(22) Filed: Oct. 28, 2019

(65) Prior Publication Data
US 2020/0067032 A1 Feb. 27, 2020

Related U.S. Application Data

(63) Continuation of application No. PCT/US2019/032413, filed on May 15, 2019.
(Continued)

(51) Int. Cl.
*H01M 50/147* (2021.01)
*H01G 11/60* (2013.01)
(Continued)

(52) U.S. Cl.
CPC ......... *H01M 50/147* (2021.01); *H01G 11/60* (2013.01); *H01G 11/62* (2013.01);
(Continued)

(58) Field of Classification Search
CPC ............ H01M 2/04; H01M 2/06; H01M 2/08; H01M 4/02; H01M 10/0569; H01G 11/60; H01G 11/62; H01G 11/64
See application file for complete search history.

(56) References Cited

U.S. PATENT DOCUMENTS 2,310,080 A * 2/1943 Hill ..................... H01M 2/1205
429/84
3,540,929 A 11/1970 Carlson
(Continued)

FOREIGN PATENT DOCUMENTS

EP 2144325 A1 1/2010
JP H1040958 A 2/1998
(Continued)

OTHER PUBLICATIONS

International Search Report for PCT/US19/32413 dated Jul. 30, 2019.
(Continued)

*Primary Examiner* — Helen Oi K Conley
(74) *Attorney, Agent, or Firm* — Manuel de la Cerra

(57) ABSTRACT

Methods, systems, and apparatuses are described for implementing electrochemical energy storage devices using a liquefied gas electrolyte. The mechanical designs of an electrochemical device to house a liquefied gas electrolyte as well as methods of filling and sealing said device are presented.

20 Claims, 3 Drawing Sheets

Related U.S. Application Data

(60) Provisional application No. 62/673,792, filed on May 18, 2018.

(51) Int. Cl.
*H01G 11/62* (2013.01)
*H01G 11/64* (2013.01)
*H01M 4/02* (2006.01)
*H01M 10/0569* (2010.01)
*H01M 50/172* (2021.01)
*H01M 50/183* (2021.01)

(52) U.S. Cl.
CPC .............. *H01G 11/64* (2013.01); *H01M 4/02* (2013.01); *H01M 10/0569* (2013.01); *H01M 50/172* (2021.01); *H01M 50/183* (2021.01)

(56) References Cited

U.S. PATENT DOCUMENTS

| | | | |
|---|---|---|---|
| 3,630,787 A * | 12/1971 | Consolloy | H01M 2/0434 429/85 |
| 4,460,666 A | 7/1984 | Dinkler | |
| 5,011,751 A | 4/1991 | Yoneyama | |
| 5,213,908 A | 5/1993 | Hagedorn | |
| 5,702,845 A | 12/1997 | Kawakami et al. | |
| 5,753,389 A | 5/1998 | Gan et al. | |
| 5,770,033 A | 6/1998 | Murphy et al. | |
| 2001/0049051 A1 * | 12/2001 | Jones | H01M 2/1205 429/86 |
| 2004/0131934 A1 | 7/2004 | Sugnaux | |
| 2004/0258989 A1 * | 12/2004 | Lee | H01M 2/0426 429/185 |
| 2005/0016840 A1 | 1/2005 | Petillo | |
| 2007/0099089 A1 | 5/2007 | Miura | |
| 2011/0003207 A1 | 1/2011 | Oh | |
| 2011/0236766 A1 | 9/2011 | Kolosnitsyn | |
| 2012/0107650 A1 | 5/2012 | Kritzer | |
| 2012/0189937 A1 | 7/2012 | Dophle et al. | |
| 2015/0072248 A1 | 3/2015 | Watanabe | |
| 2016/0261005 A1 | 9/2016 | Rustomji et al. | |
| 2017/0346134 A1 | 11/2017 | Bandhauer | |
| 2018/0375156 A1 | 12/2018 | Zhamu et al. | |

FOREIGN PATENT DOCUMENTS

| | | | |
|---|---|---|---|
| JP | 2015041526 | | 3/2015 |
| JP | 2015041526 A | | 3/2015 |
| JP | 2016152231 | | 8/2016 |
| JP | 2016152231 A | | 8/2016 |
| WO | WO 2015/074006 | * | 11/2014 .............. H01M 8/04 |
| WO | 2015074006 A1 | | 5/2015 |
| WO | 2017204984 | | 11/2017 |
| WO | 2017204984 A | | 11/2017 |

OTHER PUBLICATIONS

International Search Report and Written Opinion for PCT Application No. PCT/US2019/032413, dated Jul. 30, 2019, 13 pages.
International Search Report and Written Opinion for PCT Application No. PCT/US2019/032414, dated Aug. 2, 2019, 16 pages.
International Search Report and Written Opinion for PCT Application No. PCT/US2017/029821, dated Sep. 7, 2017, 10 pages.
Abbott, et al., "Electrochemical investigations in liquid and supercritical 1,1,1,2-tetrafluoroethane (H FC 134a) and difluoromethane (HFC 32)," J. ElectroanaL Chern., vol. 457, 1998, pp. 1-4.
Bard, A., "New challenges in electrochemistry and electroanalysis," Pure & AppL Chern., vol. 64, 1992, pp. 185-192.
Bruno, et al., "Electrochemical Oxidation of $C60^{2+}$ and $C60^{3+}$", J. Am Chern. Soc., vol. 125, 2003, pp. 15738-15739.
Garcia, et al., "Electrochemistry in Liquid $S0_2$," J. Electrochem. Soc., vol. 137, 1990, pp. 2752-2759.
Wama, et al., "Characterization of commercial supercapacitors for low temperature applications," J. Power Sources, vol. 219, 2012, p. 235-239.
Ke, et al., Electrodeposition of germanium from supercritical fluids: Phys. Chern. Chern. Phys., vol. 14, 2012, pp. 1517-1528.
Simon, et al., "Materials for electrochemcial capacitors," Nature Materials, vol. 7, 2008, pp. 845-854.
Extended European Search Report for European Patent Application No. 14861242.7; dated Mar. 1, 2017.
Amatucci et al., "Fluoride based electrode materials for advanced energy storage devices," Journal of Fluorine Chemistry, 128, 243-262 (2007).
Liu et al., "Hllow Nanostructured Anode Materials for Li-Ion Batteries," Nanoscale Res Lett, 5:1525-1534 (2010) Abstract, p. 1525, col. 1-2.
Mukerjee, "Particle size and structural effects in platinum electrocatalysis," Journal of Applied Electrochemistry, 20, 537-548 (1990) p. 537, para 2.
Abbott, A. et al., "Conductivity of $(C4H9)4N\ BF_4$ in Liquid and Supercritical Hydrofluorocarbons", J. Phys. Chern. B 2000, vol. 104, pp. 9351-9355.
Linden, D. et al., "The Lithium-Sulfur Dioxide Primary Battery—Its Characteristics, Performance and Applications", Journal of Power Sources, 1980, vol. 5, pp. 35-55.
West, w.e. et al., "Sulfuryl and Thionyl Halide-Based Ultralow Temperature Primary Batteries", Journal of the Electrochemical Society, 2010, vol. 157, pp. A571-A577.
International Search Report and Written Opinion for PCT Application No. PCT/US2014/66015, dated Apr. 13, 2015, 15 pages.

\* cited by examiner

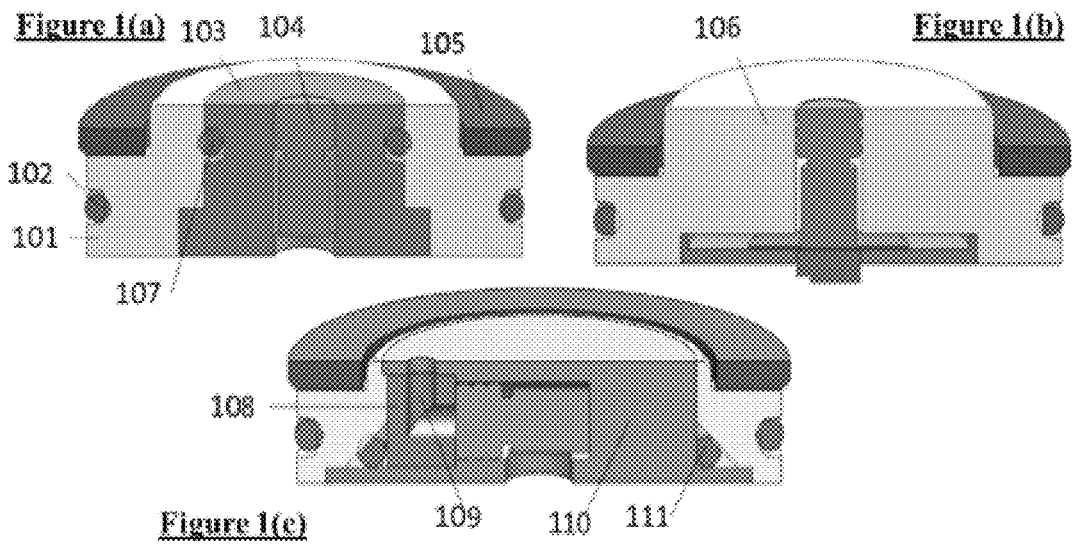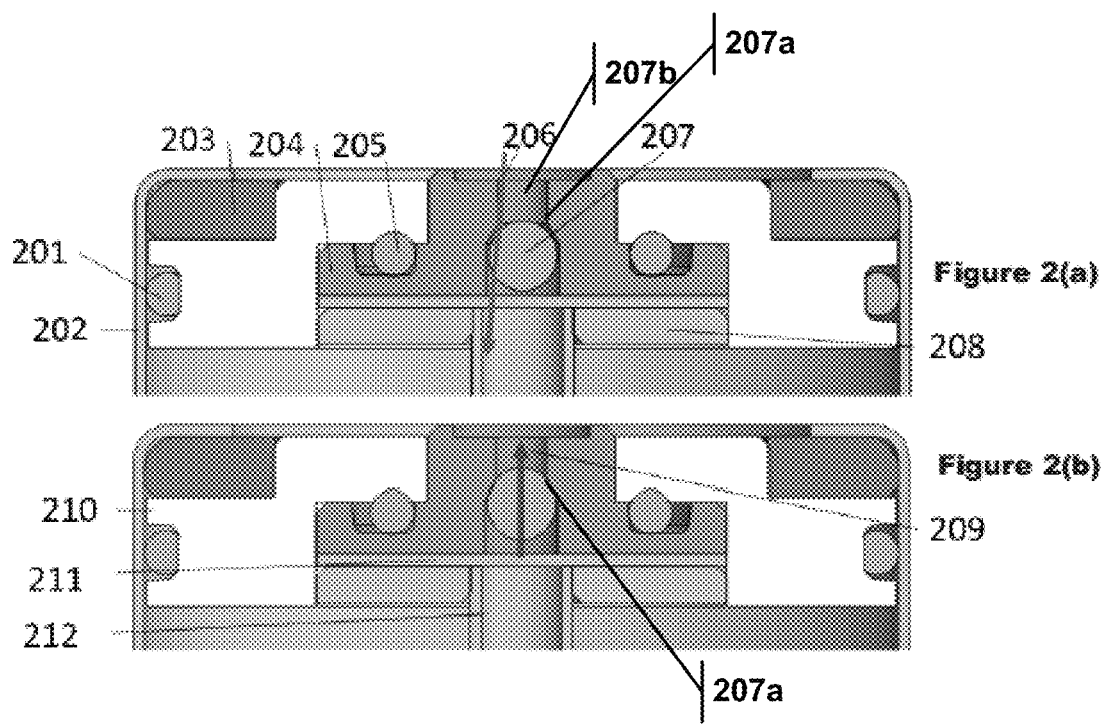

ELECTROCHEMICAL CELL CAP

1.0 CROSS-REFERENCE TO RELATED APPLICATIONS

The present application claims priority as a continuation of PCT/US2019/032413 filed on May 15, 2019, which claims the benefit of priority to U.S. Provisional Application No. 62/673,792, filed May 18, 2018. Each of these applications is incorporated by reference in its entirety.

This application is also related to PCT/US14/066015 filed on Nov. 17, 2014, U.S. application Ser. No. 15/036,763 filed on May 13, 2016, PCT/US17/29821 filed on Apr. 27, 2017, U.S. application Ser. No. 16/305,034 filed on Nov. 28, 2018, PCT/US2019/032414 filed on May 15, 2019 and U.S. Provisional Application No. 62/673,752 filed on May 18, 2018, U.S. Provisional Application No. 62/749,046 filed on Oct. 22, 2018, U.S. Provisional Application No. 61/972,101 filed on Mar. 28, 2014, and U.S. Provisional Application No. 61/905,057 filed on Nov. 15, 2013. The contents of each of these applications are hereby incorporated by reference in their entirety.

2.0 STATEMENT REGARDING FEDERALLY SPONSORED R&D

This invention was made with U.S. government support under grant 1721646 awarded by the U.S. National Science Foundation (NSF). The U.S. government has certain rights in the invention.

3.0 FIELD OF THE INVENTION

This invention relates to caps for sealing electrochemical energy storage devices, such as batteries or electrochemical capacitors. The energy storage devices may use a liquefied gas electrolyte or a liquefied gas solvent. Methods of preparing and using such cap devices, systems, and related components thereof, are also provided.

4.0 BACKGROUND

Electrochemical storage devices have been in use for several years. The electrochemical energy storage device itself is typically made up of one positive electrode and one negative electrode separated by electrically insulating material such as in a battery or an electrochemical capacitor. Conventional electrochemical storage devices use electrolytes, which are a liquid under standard conditions. Typically these electrolytes are injected into a cell in liquid state and at atmospheric pressure. This injection may occur with no cap on the device, after which a cap is placed onto the device and sealed shut. Alternatively, electrolyte injection may occur with a cap on the device with a smaller electrolyte injection hole in the cap, after which a rubber or metal stop is placed into the hole, which creates a seal. Typically, the electrolyte injection and the material insertion to plug the hole are done in two steps. This disclosure focuses on electrochemical devices which utilize electrolyte materials and solvents that are gaseous at standard room temperature of +20° C. and standard pressure (approximately 1.01325 bar). Because of the gaseous nature of these electrolytes, conventional liquid electrolyte injection may not feasible.

5.0 SUMMARY

Embodiments of the present disclosure relate to cap devices that seal the device, systems, and components thereof, in particular, of an electrochemical energy storage device that uses a liquefied gas solvent, for example, in the electrolyte thereof. Other embodiments of the present disclosure relate to methods of preparing and methods of using the cap devices, systems, and related components thereof.

One embodiment is an electrochemical energy storage device cap, or header, which enables injection of a liquefied gas solvent or electrolyte. These solvents and electrolytes may include highly volatile solvents, which are typically gaseous under standard conditions of standard room temperature of +20° C. and standard pressure (approximately 1.01325 bar). The solvent may be transferred to the cell in either gaseous or liquid form while the electrolyte, composed of liquefied gas solvent and other liquids and solid including salts, can be transferred in a liquid form. If mass transfer is in liquid form, the pressure within the mass transfer tube must be greater than the vapor pressure of the material at the temperature of the mass transfer portion. If mass transfer is in gaseous form, the pressure within the mass transfer tube should be less than the vapor pressure of the material at the temperature of the mass transfer portion. In some embodiments, the injection process occurs under a differential pressure between the pressure within the mass transfer tube and the internal pressure of the cell.

The pressure differential between mass transfer tube and cell may be used to open a plug or a valve on the cell cap when pressure within the mass transfer tube is higher than the pressure internal to the cell housing. When the pressure differential falls to near zero, this valve will seal and prevent mass from escaping even if the external pressure is lower than the internal pressure within the can. The seal will not open even under excess pressure within the device. This type of one way pressure activated plug or valve is commonly known as a check valve.

It should be noted by those skilled in the art that check valves, or components acting as such, have been installed on electrochemical devices, such as batteries and electrochemical capacitors, previously. However, in these typical uses, the check valve is used to purposefully release excess pressure buildup within the device, as the device ages or cycles or experiences over charge abuse. This pressure release allows the device to continue to operate normally or fail safely without bursting. In the present invention using the liquefied gas electrolytes, a high internal pressure is normal to the operation of the cell, and it is not desired to release high pressure through the check valve. The check valve is used only to fill the device with the liquefied gas electrolyte, after which it is sealed shut permanently during use.

Another benefit to the check valve is the release and recycling of the liquefied gas electrolyte after device use. One may mechanically force open the check valve, which will allow the liquefied gas electrolyte to evaporate through the check valve. The evaporated gas may be captured for reuse. Further, the now evacuated cell may potentially be refilled with liquefied gas electrolyte again to continue operation. This may extend the useful life of the device.

Embodiments also feature a check valve that uses a biased member or spring to require a minimum differential pressure to open.

Other embodiments feature a spring-less check valve that uses no spring to force a seal to form but instead relies entirely on a non-zero pressure differential to push a plug to seal the valve.

Other further embodiments include a method in which vacuum is first pulled on the internal housing and cell components prior to liquefied gas solvent or liquefied gas electrolyte The present disclosure also provides a check valve having a metallic housing. This metallic housing may be electrically connected to either the positive or negative electrode of the device such that the check valve itself may also serve as an electrical current pathway to the external load.

An electrochemical device is disclosed herein. In some embodiments, the electrochemical device may comprise a cell housing, two or more electrodes, an electrolyte comprising a liquefied gas electrolyte solvent, and a cap with a check valve. The check valve can be configured to seal shut under higher internal cell pressure compared to outside cell pressure.

In some embodiments, the electrochemical device may comprise an independent cap housing. In some such embodiments, the check valve can be built into the cap housing.

In some embodiments, the check valve may act as an electrical contact to one of the two or more electrodes. In some embodiments, the check valve may comprise a spring configured to create a minimum differential pressure.

A method of preparing an electrochemical device is also disclosed herein. The electrochemical device can be any one described below in the Detailed Description or described elsewhere herein. The method may comprise transferring the liquefied gas solvent into the cell housing by connecting the liquefied gas solvent to the check valve. The method may further comprise building a pressure differential between the interior and exterior of the cell housing. In some embodiments, the pressure differential may be created by a temperature differential. In some embodiments, the pressure differential may be created in gaseous argon, gaseous nitrogen, gaseous oxygen, gaseous carbon dioxide, gaseous hydrogen, gaseous helium, or a combination thereof.

In some embodiments, the method of the preceding paragraph may comprise adding salt to the cell housing prior to transferring the one or more liquefied gas solvents into the cell housing.

Additional aspects, alternatives and variations as would be apparent to persons of skill in the art are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

6.0 BRIEF DESCRIPTION OF THE DRAWINGS

FIGS. 1(a)-1(c) shows a cross-sectional view of one possible embodiment of the mechanical constructions of a cell cap. FIG. 1(a) shows a press fit into a metallic component. FIG. 1(b) shows the check valve inserted into an electrically insulating component. FIG. 1(c) shows a check valve inserted horizontally into a cap according to one embodiment.

FIGS. 2(a)-2(b) show cross-sectional views of one possible embodiment of the mechanical constructions of a cell cap. In this design, a check valve based on a ball is housed directly into the cap housing. In FIG. 2(a), the ball may open a pathway for mass transfer. However, as shown in FIG. 2(b), when the internal housing pressure is greater than the external pressure, the ball may close the pathway for mass transfer.

6.0 DETAILED DESCRIPTION

Figure 3:
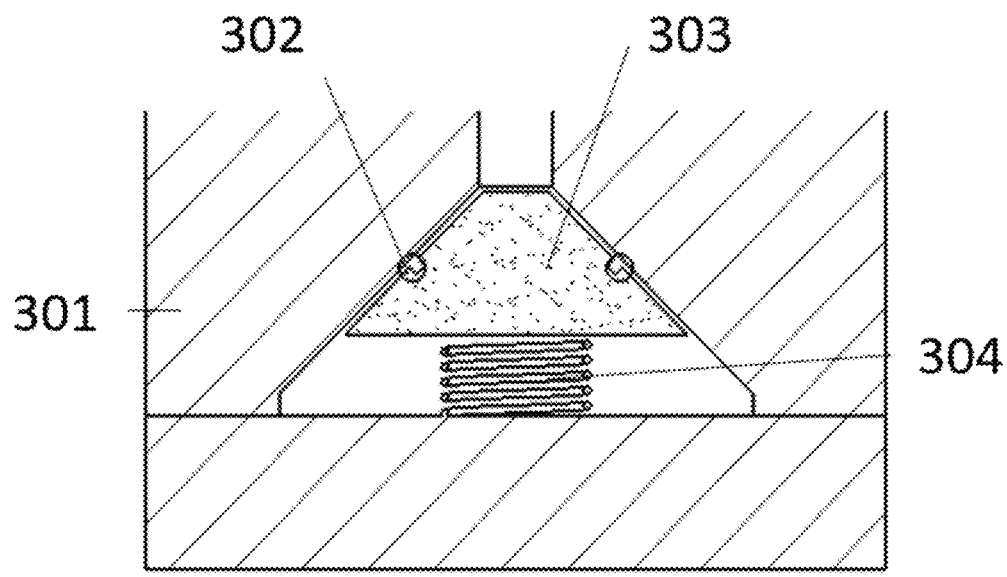
FIG. 3 shows a cross-sectional view of one possible embodiment of the mechanical constructions of a cell cap. In this design, a check valve using a spring creates a minimum differential pressure to seal the cap.

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms unless noted otherwise. Similarly, various steps of the methods shown and described herein are not necessarily performed in the order indicated, or performed at all in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection, unless otherwise noted.

One embodiment relates to a cap design and electrolyte injection method in which a plug is used to reversibly create a seal in an energy storage device such as a battery or capacitor. The seal may be created as a function the differential pressure placed on the plug such that the plug opens when the pressure external the cell device housing is greater than the pressure internal to the housing. A liquefied gas solvent or liquefied gas electrolyte may be injected into a device, and the plug creates an immediate seal when the differential pressure is near zero and when flow of liquefied gas solvent or electrolyte is ceased. Further, the plug may itself be housed inside a smaller metal housing that is inserted into the cap. This metal housing may itself be used as an electrical contact to either the positive or negative electrode. Examples of the electrochemical energy storage device are described in International Patent Application Publication Nos. WO 2015/074006 (PCT/US2014/066015)

and WO 2017/204984 (PCT/US2017/029821), which are incorporated by reference in their entireties.

In some processes, vacuum is pulled on the internal housing containing cell components prior to liquefied gas solvent or liquefied gas electrolyte fill to remove any gas from the cell. This may be done by mechanically holding the plug in an open state during vacuum.

In some processes, a temperature differential between liquefied gas solvent or electrolyte to create a pressure differential due to the vapor pressure difference at the different temperatures is used to fill a cell. This can be done by holding the liquefied gas solvent or electrolyte at room temperature and lowering cell or device temperature to around +10° C., around 0° C., around −10° C., around −20° C., around −30° C., around −40° C., around −50° C., around −60° C., around −70° C., or around −80° C. Alternatively, the temperature of the liquefied gas solvent or electrolyte may be increased to around +25° C., around +30° C., around +35° C., around +40° C., around +45° C. and holding the cell at room temperature. Alternatively, the temperature of the liquefied gas solvent or electrolyte may be increased and cell to be filled temperature decreased. As used herein, one of skill in the art will understand the temperature differential refers to a difference in temperature between the cell and liquefied gas solvent source, such as a compressed gas cylinder. As used herein, one of skill in the art will understand the pressure differential refers to a difference in pressure between the cell and liquefied gas solvent source, such as a compressed gas cylinder, created by the vapor pressure of the liquefied gas solvent or liquefied gas electrolyte or an externally applied pressure. One of skill in the art will understand that the vapor pressure of the liquefied gas solvent or liquefied gas electrolyte may vary according to temperature, and so a combination of both temperature and pressure differential may be used to fill a cell.

In some processes, an external pressure source to force the liquefied gas solvent or liquefied gas electrolyte through the mass transfer tube and into the cell is used. An external pressure may come from a variety of gasses such as argon, nitrogen, oxygen, carbon dioxide, hydrogen, helium, amongst others. The pressure used to force the material through the mass transfer tube should be greater than that of the vapor pressure of the material at the process temperature. Ideally, pressure should be around 1 psi, around 5 psi, around 10 psi, around 20 psi, around 30 psi, around 50 psi, around 100 psi, around 200 psi, or around 300 psi greater than the vapor pressure.

In some embodiments, the liquefied gas solvent is capable of being placed under a compressive pressure equal to, or greater than, the liquefied gas solvent's vapor pressure at a temperature when the compressive pressure is applied, thereby keeping the liquefied gas solvent in a liquid phase. In some embodiments, the liquefied gas solvent has a vapor pressure above an atmospheric pressure of 100 kPa at a room temperature of 293.15 K.

In some embodiments, the liquefied gas solvent comprises one or more materials selected from the group consisting of fluoromethane, difluoromethane, sulfuryl fluoride, thionyl fluoride, carbon dioxide, methyl ether, 1,1-difluoroethane, chloromethane, and a combination thereof. In some embodiments, the liquefied gas solvent comprises fluoromethane and carbon dioxide. In some embodiments, the liquefied gas solvent comprises fluoromethane and sulfuryl fluoride. In some embodiments, the liquefied gas solvent comprises fluoromethane, sulfuryl fluoride, and carbon dioxide. In some embodiments, the ratio of sulfuryl fluoride to fluoromethane is lower than 1:9. In some embodiments, the ratio of sulfuryl fluoride to carbon dioxide is about 1:1.

A check valve which is used on the cell cap may take several configurations. In one embodiment, the check valve has an independent housing which may be inserted into a cap. The mechanism within the check valve housing may or may not be biased or spring operated. The seal within the check valve may be made by rubber on rubber contact, metal on rubber contact or metal to metal contact. The check valve housing and the material in which it is inserted may each be metallic or electrically insulating. The valve may be held mechanically in the cap by interference fit, welding, solder, brazing, epoxy, glass to metal seal or other suitable method known in the art. The location of the check valve maybe be located anywhere within the cap, but most preferably in the center, and oriented for gas flow in any direction, but most preferably vertically oriented along the cell's length. With reference to the outside of the cell housing, the top of the valve may also be flat with the top of the cap, but could also extrude above the cap surface for easy electrical contact or be embedded below the cap surface such that the top of the valve is below the top of the cap. In order to ensure high integrity of sealing the high pressure liquefied gas solvent or liquefied gas electrolyte within the cell, an additional plug may be added to the top of the check valve. This plug may be welded, soldered, or press fit to ensure seal. With reference to the inside of the cell housing, the valve may lie flat with the bottom of the cap, extrude out further than the bottom of the cap, or have the valve bottom higher than the cap bottom. In one embodiment, the valve bottom extends further than the cap bottom and into the mandrel diameter of the electrode winding, which will allow gas to flow preferentially down the center of the electrode winding. Electrical contact from either the negative or positive electrode may be made directly to the valve such that it may be used as a current collector contact and contacted from outside the cell to make electrical contact to the electrode.

In FIGS. 1(a)-(c), the check valve 104 is held in place by a press fit. FIG. 1(a) features a press fit into a metallic component 103. The metallic component is also mechanically held in place via interference fit with electrically insulating component 101. A component 105 is also placed on top of the cap to weld to the can edge to further improve mechanical rigidity. O-ring components 102 and 107 are also used to eliminate leak paths through interference fit pathways. In this embodiment, electrical conduction to one of the electrodes may be through 103 or 104.

Further, FIG. 1(b) features the check valve inserted into an electrically insulating component 106. In this scenario, electrical conduction to one of the electrodes may be made directly through a metallic check valve housing 104.

Further, FIG. 1(c) features a check valve that is inserted horizontally into the cap into component 110. After insertion, the valve is held in place by component 108. The cap features an overall lower height than cap designs featured in FIGS. 1(a) and 1(b). Further, it is much more difficult to eject the check valve from cap due to high pressures built up within the cell housing.

In another embodiment, the check valve is built into the cap housing itself, as shown in FIGS. 2a-b. In this example, a rubber or metal ball 207 is housed in a metal housing 204, which has an interference fit to an electrically insulating component 210. There is also a mesh screen 211, which supports the ball from falling out from the cap housing, and a mesh support 208. When external pressure is greater than internal housing pressure, the ball unseats from the valve seat 207a, opening a pathway (shown as arrow 206) for mass transfer from the injection port 207b, as shown in FIG. 2(a). When the internal housing pressure is greater than the external pressure, the ball 207 may move to seat with the valve seat 207a (shown by arrow 209), closing the pathway for mass transfer, as shown in FIG. 2(b). The additional metal component 203 may be used to weld or solder the crimped can walls 202 to prevent the internal pressure from pushing the cap out of the can.

In some embodiments, the check valve is fluidly connected to an area of the housing and allows the liquefied gas solvent or electrolyte to flow into the housing, preventing the liquefied gas solvent or electrolyte from flowing out of the housing.

In another embodiment, the cap may feature a valve 303 built into the cap 1 which uses a spring 304 to create a minimum differential pressure in order to open the valve and allow mass transfer, as shown in FIG. 3. In this example, there is a greater surface area 302 to make a seal due to the non-circular rubber component geometry.

Figure 4:
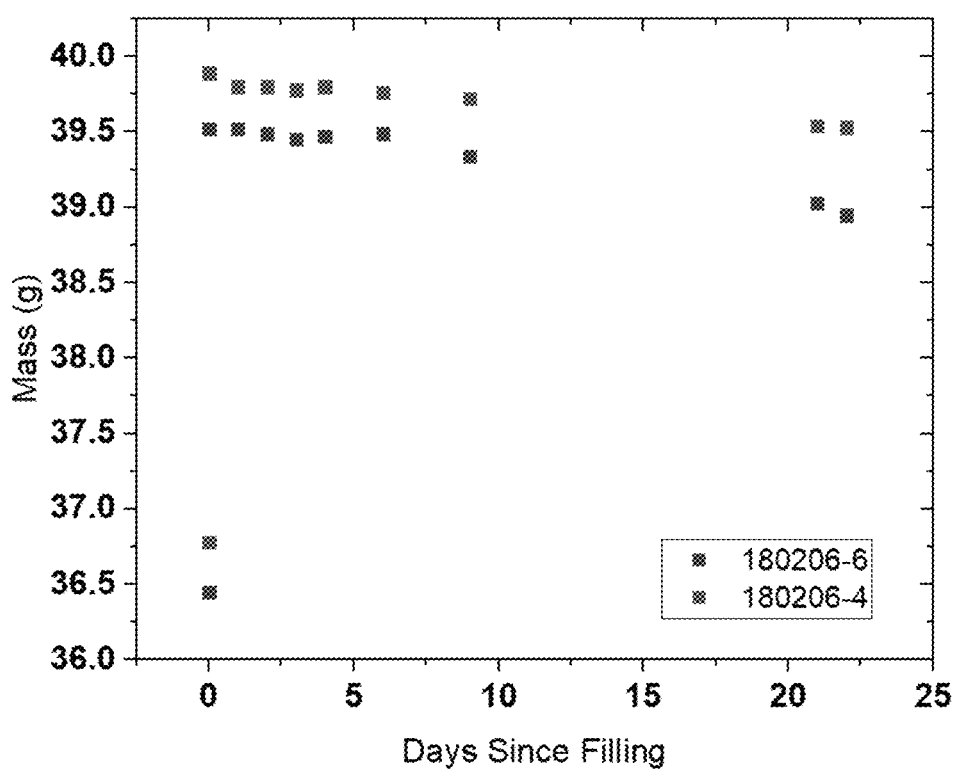
FIG. 4 is a plot showing the change of mass over number of days for two representative cells before and after liquefied gas filling and sealing.

FIG. 4 shows a plot of mass vs. time of example cell that w343 constructed using a geometry similar to FIG. 2. At day 0, the cells were emptied of liquefied gas solvent, and at day 1, the cells were filled with solvent using a differential pressure method and check valve. The mass increased by approximately 3 grams for two example cells. The mass held fairly constant over several days, showing the very good seal on the check valve and the rest of the cap seals.

Figure 5:
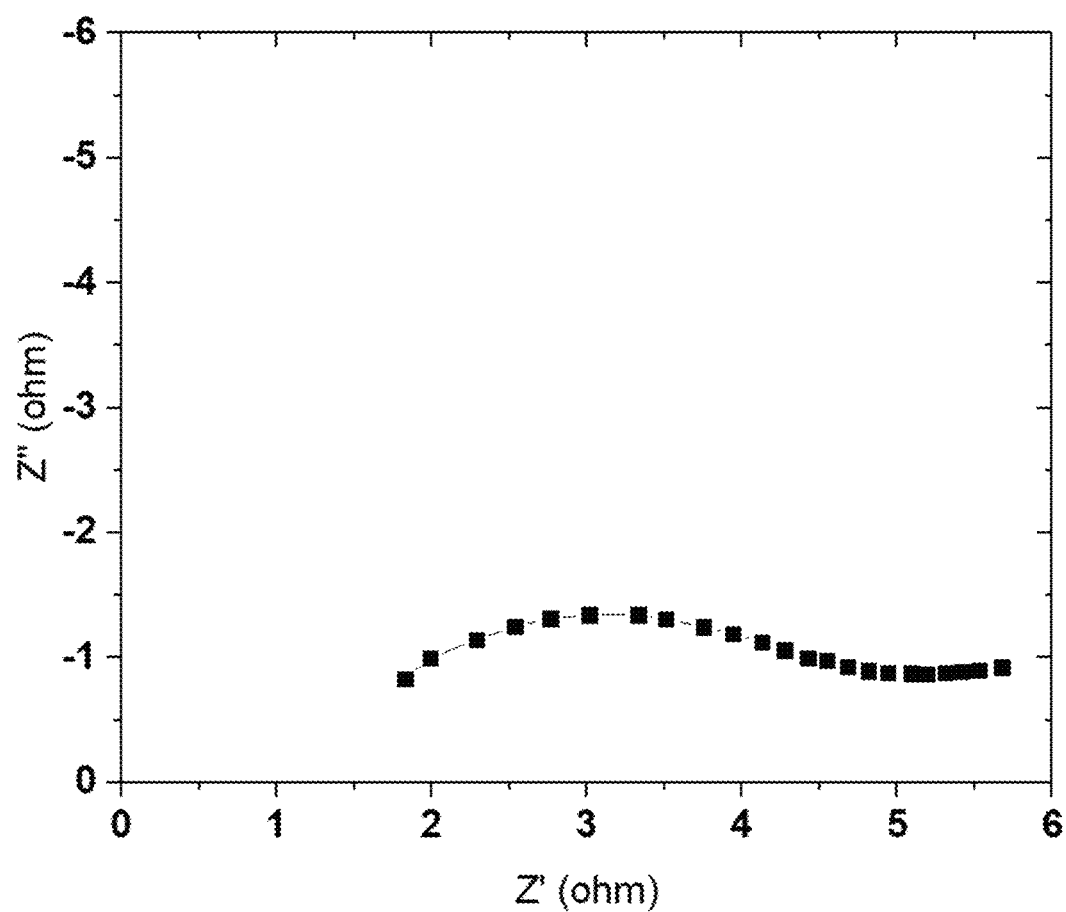
FIG. 5 shows an impedance spectra of an exemplified cell after filling it with liquefied gas solvent.

An electrochemical cell was built with a cap design similar to that of FIG. 2 and with battery-type electrodes. A salt was preloaded into the cell device, and liquefied gas solvent was mass transferred into a cooled cell as a gas and was liquefied within the cell due to the pressure within the housing being higher than the vapor pressure of the solvent at the cell housing temperature. The solvent mass transfer went through the check valve in the cap and was sealed shut after filling. After liquefying inside the cell, the solvent mixes with the salt in the cell to form a liquefied gas electrolyte. An impedance spectra of this cell is shown in FIG. 5, showing a functional cell. Electrical connection to one electrode was made through the check valve metal component, while electrical connection to the other electrode was made through the cell metal housing.

Although exemplary embodiments and applications of the invention have been described herein including as described above and shown in the included example Figures, there is no intention that the invention be limited to these exemplary embodiments and applications or to the manner in which the exemplary embodiments and applications operate or are described herein. Indeed, many variations and modifications to the exemplary embodiments are possible as would be apparent to a person of ordinary skill in the art. The invention may include any device, structure, method, or functionality, as long as the resulting device, system or method falls within the scope of one of the claims that are allowed by the patent office based on this or any related patent application.

The invention claimed is:

1. An electrochemical device, comprising:
    a cell housing;
    two or more electrodes;
    a liquefied gas electrolyte comprising a liquefied gas solvent, and
    a cap with a check valve, the check valve comprising a valve seat, a moveable plug constructed to seat into the valve seat or unseat therefrom, and an injection port in fluid communication with the moveable plug for transferring the liquefied gas electrolyte into the cell housing;
    wherein the check valve further comprises two configurations:
        a mass transfer configuration, wherein the injection port is connected to a mass transfer tube that is under a pressure that is sufficient to unseat the moveable plug from the valve seat, thus allowing the transfer of liquefied gas solvent from the mass transfer tube into the cell housing; and
        a sealed configuration, wherein the pressure of the liquefied gas electrolyte within the cell housing exerts a force on the moveable plug that is sufficient to seat the moveable plug into the valve seat, preventing the transfer of mass across the check valve.

2. The electrochemical device of claim 1, wherein the electrochemical device comprises a cap housing that is independent from the cell housing.

3. The electrochemical device of claim 2, wherein the check valve is built into the cap housing.

4. The electrochemical device of claim 1, wherein the check valve acts as an electrical contact to one of the two or more electrodes.

5. The electrochemical device of claim 1, further comprising a plug or seal in fluid connection with the check valve.

6. The electrochemical device of claim 5, wherein the plug or seal is soldered, welded or press-fitted.

7. The electrochemical device of claim 1, wherein the liquefied gas solvent is capable of being placed under a compressive pressure equal to, or greater than, the liquefied gas solvent's vapor pressure at a temperature when the compressive pressure is applied, thereby keeping the liquefied gas solvent in a liquid phase.

8. The electrochemical device of claim 7, wherein the liquefied gas solvent has a vapor pressure above an atmospheric pressure of 100 kPa at a room temperature of 293.15 K.

9. The electrochemical device of claim 1, wherein the liquefied gas solvent is selected from the group consisting of: fluoromethane, difluoromethane, sulfuryl fluoride, sulfuryl chloride, carbon dioxide, 1,1-difluoroethane, chloromethane, and a combination thereof.

10. A method of preparing an electrochemical device of claim 1 comprising:
    (a) connecting the liquefied gas solvent to the check valve;
    (b) creating a pressure differential between the interior and exterior of the cell housing to open the check valve;
    (c) transferring one or more liquefied gas solvents to the cell housing through the check valve.

11. The method of claim 10, wherein the pressure differential is created by a temperature differential between the interior and exterior of the cell housing.

12. The method of claim 10, wherein the pressure differential is created by introducing gaseous argon, gaseous nitrogen, gaseous oxygen, gaseous carbon dioxide, gaseous hydrogen, gaseous helium, or a combination thereof into the cell housing.

13. The method of claim 10, further comprising adding salt to the cell housing prior to transferring the one or more liquefied gas solvents into the cell housing.

14. The method of claim 10, further comprising sealing the check valve after step (c).

15. The method of claim 14, wherein the sealing step comprises soldering, press-fitting or welding a plug or seal.

16. A method of preparing an electrochemical device of claim 1 comprising:
 (a) connecting the liquefied gas solvent to the check valve;
 (b) creating a pressure differential between the interior and exterior of the cell housing to open the check valve;
 (c) transferring one or more liquefied gas solvents to the cell housing through the check valve; and
 (d) opening the check valve to release the liquefied gas electrolyte.

17. The method of claim 16, further comprising:
 (e) collecting the released liquefied gas electrolyte.

18. The method of claim 16, further comprising:
 (e) transferring one or more liquefied gas electrolytes to the cell housing through the check valve.

19. The electrochemical device of claim 1, further comprising a salt.

20. An electrochemical device comprising:
 a cell housing;
 two or more electrodes;
 a liquefied gas electrolyte comprising a liquefied gas solvent; and
 a cap with a check valve, the check valve comprising a valve seat, a moveable plug constructed to seat into the valve seat or unseat therefrom, a spring constructed to exert a spring force on the moveable plug, and an injection port in fluid communication with the moveable plug for transferring the liquefied gas electrolyte into the cell housing;
wherein the check valve further comprises two configurations:
 a mass transfer configuration, wherein the injection port is connected to a mass transfer tube that is under a pressure that is sufficient to unseat the moveable plug from the valve seat, thus allowing the transfer of liquefied gas solvent from the mass transfer tube into the cell housing; and
 a sealed configuration, wherein the spring force is sufficient to seat the moveable plug into the valve seat, preventing the transfer of mass across the check valve.

\* \* \* \* \*